(12) United States Patent
Cherif Idrissi El Ganouni et al.

(10) Patent No.: US 9,639,069 B2
(45) Date of Patent: May 2, 2017

(54) METHOD FOR SCHEDULING THE OPERATION OF ENERGY DISTRIBUTION DEVICES, AND INSTALLATION IMPLEMENTING SAME

(75) Inventors: Oussama Cherif Idrissi El Ganouni, Paris (FR); Guy Vallet, Maisons-Alfort (FR)

(73) Assignee: FIVES STEIN (FR)

( * ) Notice: Subject to any disclaimer, the term of this patent is extended or adjusted under 35 U.S.C. 154(b) by 1153 days.

(21) Appl. No.: 13/808,781

(22) PCT Filed: Mar. 3, 2011

(86) PCT No.: PCT/IB2011/050899
§ 371 (c)(1),
(2), (4) Date: Jan. 7, 2013

(87) PCT Pub. No.: WO2012/004686
PCT Pub. Date: Jan. 12, 2012

(65) Prior Publication Data
US 2013/0116839 A1 May 9, 2013

(30) Foreign Application Priority Data

Jul. 9, 2010 (FR) ...................................... 10 55596

(51) Int. Cl.
*G05B 13/02* (2006.01)
*C21D 11/00* (2006.01)
(Continued)

(52) U.S. Cl.
CPC .............. *G05B 13/02* (2013.01); *C21D 11/00* (2013.01); *F27B 9/36* (2013.01); *F27D 99/0033* (2013.01)

(58) Field of Classification Search
CPC ..................................................... G05B 13/02
(Continued)

(56) References Cited

U.S. PATENT DOCUMENTS 6,095,793 A * 8/2000 Greeb ....................... F02C 9/28
431/11
2006/0147867 A1 7/2006 Morel

FOREIGN PATENT DOCUMENTS

DE 19512633 C1 10/1996
FR 2167027 A5 8/1973
(Continued)

*Primary Examiner* — Tejal Gami
(74) *Attorney, Agent, or Firm* — The Belles Group, P.C.

(57) ABSTRACT

The invention relates to a method for optimizing the supply of energy, over a time interval I of duration D, to an installation equipped with N energy distribution devices operating in all-or-nothing mode and by duration modulation, an operation duration Ai being allocated to each of the N energy distribution devices over the time interval I by a command/control system of the installation. According to the method: a schedule is defined over the time interval I by means of the time division of the set of operating sequences of the N energy distribution devices (B1, B2 . . . BN), and the schedule is calculated before the start of the time interval I by taking account of the desired operation durations Ai of each energy distribution device and, for the distribution device of order number 1, by searching for the optimal position(s) over the time interval of the operating sequence (s) of this distribution device which make it possible to minimize a function U representative of the fluctuations of the energy throughput over the time interval, the sequences of the other devices retaining the positions of the initial schedule, so as to obtain a resulting optimal schedule; and the above is repeated on the basis of the optimal schedule, using successively the distribution devices of higher order number up to the distribution device of order number N, and that which minimizes function U is adopted.

26 Claims, 5 Drawing Sheets

(51) Int. Cl.
  *F27B 9/36* (2006.01)
  *F27D 99/00* (2010.01)
(58) Field of Classification Search
  USPC .............................. 700/286; 431/12; 432/122
  See application file for complete search history.

(56) References Cited

FOREIGN PATENT DOCUMENTS

| | | | |
|---|---|---|---|
| FR | 2853959 | A1 | 10/2004 |
| GB | 1418678 | A | 12/1975 |

* cited by examiner 2.1

2.2

3.1

3.2

METHOD FOR SCHEDULING THE OPERATION OF ENERGY DISTRIBUTION DEVICES, AND INSTALLATION IMPLEMENTING SAME

PRIORITY

Priority is claimed as a national stage application, under 35 U.S.C. §371, to PCT/IB2011/050899, filed Mar. 3, 2011, which claims priority to French Application No. 1055596, filed Jul. 9, 2010. The disclosures of the aforementioned priority applications are incorporated herein by reference in their entirety.

The present invention relates to the optimization of the energy supply of an installation equipped with energy distribution devices operating in all or nothing mode and in operating duration modulation mode. The energy distribution devices may especially be burners or electrical resistors.

The invention relates more particularly to industrial furnaces equipped with burners as energy distribution devices. Patent FR 2853959 describes an exemplary furnace at which the invention is particularly aimed.

For an on/off mode of operation, each burner is supplied with oxidant and fuel through individual automatic isolating valves. Each valve is equipped with position detectors, for example with an end of opening travel sensor and an end of closing travel sensor.

Two or more energy distribution devices can operate in a synchronous manner so that they are always turned on and turned off at the same time. In this case, the synchronous devices are considered to be the parts of one and the same energy distribution device.

Hereinafter, we will consider that the oxidant is air and the fuel is gas, knowing that all types of oxidant and fuel are possible according to the invention.

The furnace is driven by means of a command-control system which, on the basis of the requirements needed for heating the products, determines the thermal energy demand that must be delivered by each burner, especially as a function of its position in the furnace.

The thermal energy demands are refreshed periodically on the basis of a time interval I, of duration D, an integer multiple of a time measurement unit r, typically a second. The duration D of the time interval is dependent especially on the size of the burners, the isolating valves and the furnace. For example defined at 60 seconds, it is thereafter adjusted during commissioning, for example between 30 and 120 seconds.

The burners operating in all or nothing mode, the thermal energy demand translates into a duration of ignition. Thus, during the time interval I, the opening time $\Delta i$ and closing time of the air and gas valves of each burner is proportional to the thermal energy demand for the relevant burner. The opening time $\Delta i$ is lower than, or at most equal to, the duration D of the time interval I.

The opening and the closing of the air and/or gas valves disturb the equilibrium of the pressures in the pipelines, in the furnace and in the duct for evacuating the combustion products. The disturbances thus created are all the more considerable the more often and significantly the number of open valves varies during the time interval. The various control loops of the installation are not able to stabilize the pressures if the scheduling of the ignition of the burners is not chosen in an optimal manner. The term "scheduling" designates the temporal allotment of the durations of operation of the burners over the time interval I.

Moreover, for burners of significant powers, the air and gas supply valves are of large dimensions. It follows from this that full openings and closings of the valves are not immediate and require a certain time span which must be taken into account before actuating the valves again. During these transient regimes, combustion is not optimal in terms of energy efficiency and pollution. Thus, when the energy demand is too low, the duration of ignition of these burners is not sufficient for combustion to be correct.

Likewise, frequent changes of state, corresponding to the ignition or to the shutdown of a burner, are the source of mechanical fatigue of the valves and burners. Reducing the frequency of these changes of state makes it possible to increase their lifetime.

Moreover, when the energy demands are too great, there is a risk of exceeding the capacity of the furnace which may translate into a situation in which there is a dearth of air and/or gas. The capacity of the furnace depends on the initial design, but also on the running state of the various equipment. For safety reasons, the exceeding of capacity generally triggers a shutdown in the operation of the furnace.

As we have just seen, numerous problems may result from poor scheduling of the ignition of the burners.

Patent FR2853959 describes a method of controlling a steel-making reheating furnace characterized in that the order of ignition of the burners is chosen so as to reduce the pressure variations in the furnace and in the circuits supplying fuel and oxidant for the burners. According to this method, the position of the operating sequence of a burner in the time interval T is chosen as a function of that of the other burners. This solution exhibits limits especially when numerous burners have an operating sequence of a duration greater than half the duration of the time interval T.

To define the optimal scheduling, the first constraint with which it is necessary to cope is that of the time required by a computer or calculator which dispatches the opening and closing instructions to the burner supply valves. It is clear that in an operational framework we have only a few seconds to find a scheduling which addresses all the criteria stated above, thereby excluding the use of the usual approaches of exhaustive search type which may require considerable calculation time.

Thus, the invention consists mainly of a method for optimizing the energy supply, over a time interval I of duration D, of an installation equipped with N energy distribution devices operating in all or nothing mode and in duration modulation mode, a duration of operation $\Delta i$, less than or equal to D, being allocated to each of the N energy distribution devices over the time interval I, the durations $\Delta i$ being deduced from the energy demand of the installation and provided by a command-control system of the installation, characterized in that:
- the duration of operation $\Delta i$ of an energy distribution device either consists of a single operating sequence of duration $\Delta i$, or is divided into several sequences of partial durations, whose sum is equal to $\Delta i$,
- a scheduling is defined over the time interval I by a temporal allotment of the set of operating sequences of the N energy distribution devices,
- and the scheduling is calculated before the start of the time interval I by taking account of the desired durations $\Delta i$ of operation of each energy distribution device.

Moreover, according to the invention, the scheduling is calculated as follows:
a/ any arbitrary initial scheduling is chosen,
b/ an order number from 1 to N is associated with each distribution device, c/ for the distribution device of order number 1, a search is conducted for the number, the duration or durations and the position or positions over the time interval I of the operating sequence or sequences of this distribution device which make it possible to minimize a function U representative of the fluctuations of the energy throughput over the time interval, the sequences of the other devices maintaining the positions of the initial scheduling, and a resulting scheduling is obtained with the number, the duration or durations and the optimal position or positions retained for the sequence or sequences of the device of order number 1, d) step c) is repeated on the basis of the scheduling resulting from step c) by successively considering the distribution devices of higher order number up to the distribution device of order number N.

Advantageously, the method for optimizing the energy supply comprises the following additional steps:

e) by using as initial scheduling the scheduling retained in step d), a new order number from 1 to N is associated with each distribution device and steps c) and d) are repeated, f) step e) is repeated a number of times compatible with the calculation time available before the start of the time interval.

According to a particularly advantageous variant of the invention, the order number allocated to each distribution device is dependent on the desired durations of operation, the device of order number 1 is that whose desired duration of operation is the longest and the device of order number N is that whose desired duration of operation is the shortest.

The function U to be minimized may be the sum of the absolute value of the fluctuations of the energy throughput $Q_j$ about a mean value $Q_{mean}$ during the time interval I:

$$U = \sum_{j=1}^{M} |Q_j - Q_{mean}|$$

The scheduling which minimizes a function U taking into account not only the fluctuation of the energy throughput during the time interval I, but also the variation of the energy throughput between the instant preceding the start of the time interval and the instant following the start of the time interval, can also be retained as scheduling. The function U is then the sum of the absolute value of the fluctuations of the energy throughput about a mean value during the time interval I and of the variation of the total energy throughput between the instant preceding the start of the time interval and the instant following the start of the time interval.

Another exemplary function U to be minimized consists of the sum of the squares of the deviations with respect to the arithmetic mean:

$$U = \sum_{j=1}^{M} (Q_j - Q_{mean})^2$$

According to another example, the function U to be minimized consists of the sum of the absolute value of the variations of the energy throughput between two successive subdivisions during the time interval I:

$$U = \sum_{j=1}^{M-1} |Q_j - Q_{j+1}|$$

According to yet another example, the function U to be minimized consists of the sum of the square of the variations of the energy throughput between two successive subdivisions during the time interval I:

$$U = \sum_{j=1}^{M-1} (Q_j - Q_{j+1})^2$$

The function U to be minimized may be supplemented with additional terms.

According to another possibility, the scheduling for which the total energy throughput engendered does not exceed a defined threshold is retained as scheduling.

Advantageously, it is ensured that the total energy throughput engendered by the scheduling obtained does not exceed a defined threshold.

Preferably, the desired durations of operation of the energy distribution devices are reduced if they lead to a total energy throughput which exceeds the defined threshold.

Advantageously, for each energy distribution device, the gap between the duration of operation over a time interval I and the desired duration of operation of the device is limited by a maximum gap, especially 5% of the duration of the time interval.

Preferably the sequences for each energy distribution device correspond at most to three changes of state of the device over a time interval I.

Advantageously, two successive changes of state of each energy distribution device are spaced apart by a minimum time gap which corresponds for example to the time required for the establishment of a steady regime of the energy distribution device, especially so as to take into account the opening or closing time for the valves. The minimum time gap may be at least equal to a twentieth of the duration D of the time interval, i.e. D/20.

For each energy distribution device, the last change of state during the time interval I is preferably spaced apart by a minimum time gap from the end of the interval, especially at least equal to a twentieth of the duration D of the time interval, i.e. D/20.

The search for the operating sequence or sequences of an energy distribution device which make it possible to minimize the function U may be performed in a defined subset of the set of possible sequences.

Preferably, the defined subset of the set of possible sequences consists of sequences comprising at most three changes of state of an energy distribution device over a time interval I.

According to an exemplary embodiment of the invention, an initial scheduling is that where all the energy distribution devices are off during the time interval I.

The order number allocated to each distribution device after the first iteration may be chosen in a random manner.

The time interval I is advantageously divided into a number M of temporal subdivisions of not necessarily equal durations. The changes of state of the distribution devices take place between two successive temporal subdivisions.

According to an exemplary embodiment of the invention, the states of the distribution devices are coded according to a binary matrix Z of size N×M (N rows×M columns), each of the N rows of which codes the state of the various distribution devices during the M successive temporal subdivisions and each column of which corresponds to a temporal subdivision.

According to another exemplary embodiment of the invention, the function U is expressed in the form $\Sigma_i \Sigma_j \alpha_{ij} y_i y_j$, which is the weighted sum of the products of the pairs of components $y_i y_j$ of a vector Y, with i and j integer indices between 1 and N×M, and $\alpha_{ij}$ are weighting coefficients.

The total energy throughput resulting from the scheduling is, at each instant of the time interval I, the sum of the throughputs engendered by the distribution devices that are on at this instant.

According to the invention, the objective of the optimization is also aimed at the energy throughput being monotonic, increasing or else decreasing, during the time interval.

According to the invention, the energy throughput variation, between two successive temporal subdivisions, engendered by the choice of scheduling of each energy distribution device must not be greater than a maximum value determined as a function of the characteristics and reactivities of the various parts of the system. For burners, these are especially the characteristics and reactivities of the isolating valves, of the combustion air fan, of the pressure regulator on the gas network, of the smoke exhauster and of the dimensions of the air, gas and smoke circuits. The maximum value of the variation is preferably less than or equal to half the value of the energy throughput before variation.

Moreover, the optimization is aimed at ensuring that the total energy throughput engendered does not exceed a defined threshold. This threshold may be different according to the time interval I considered. It may for example result from the maximum energy throughput $Q_{max}$ corresponding to the capacity of the furnace. It may also be dependent on the energy throughput of the previous time interval, for example so as to limit the throughput variations between two successive time intervals.

Thus, the desired durations of operation of the energy distribution devices, as a function of the demand of the command-control system, are reduced if they lead to a total throughput which exceeds the defined threshold.

According to a variant embodiment of the invention, the search for a solution, at each refreshing of the energy demands, proceeds in two steps, the objective being always to propose a scheduling for each time interval of duration D which best delivers the energy demands without ever causing shutdown of the furnace:

1/ Search for a first scheduling where, for each burner, ignition will be chosen in such a way that there are no more than three changes of state, that the durations of establishment and of extinguishing of the flame are complied with and that there are no changes of state at the end of the time interval, 2/ Adjustment of the solution in accordance with the principle of the simulated annealing scheme which consists in favoring the best schedulings without however excluding the worst. The process stops after a fixed number of iterations or else on completion of a fixed time span and the best solution obtained is kept.

The list of energy distribution devices is traversed in a defined order and for each device of the list the scheduling of the ignition of this device is chosen within the subset of possible values which complies with the desired duration of ignition and which minimizes the function U, having regard to the scheduling choices already performed for the previous energy distribution devices and by considering that the following energy distribution devices are shut down.

According to a variant embodiment of the invention, the list of energy distribution devices is traversed in a random order and for each device of the list, the scheduling of the ignition of this device is chosen within the subset of possible values which complies with the desired duration of ignition and which minimizes the function U, having regard to the schedulings already performed for the other energy distribution devices.

The traversal of the list of energy distribution devices is repeated a fixed number of times, in particular about a hundred, or else for a limited duration, in particular one to two seconds, and on completion, the best scheduling obtained is maintained.

According to an exemplary embodiment of the invention, the energy distribution devices are burners and the energy throughput of the installation is proportional to the fuel supply throughput for the burners. The energy distribution devices can also consist of electrical resistors.

The method defined above is advantageously implemented for the driving of a reheating furnace whose energy distribution devices consist of burners or electrical resistors.

The invention also relates to an installation equipped with energy distribution devices operating in all or nothing mode and in operating duration modulation mode, characterized in that it comprises a computer or calculator programmed to control the energy distribution devices in accordance with a method such as defined above.

The installation advantageously consists of an industrial furnace.

The invention consists, apart from the provisions set forth hereinabove, of a certain number of other provisions which will be more explicitly dealt with hereinafter in regard to exemplary embodiments, described with reference to the appended drawings, but which are wholly non-limiting. In these drawings:

FIG. 1 is a simplified schematic view of an industrial furnace equipped with burners constituting the energy distribution devices.

FIG. 2 comprises two simplified charts illustrating, as a function of the time plotted as abscissa, the energy throughput Q plotted as ordinate for a first scheduling of the durations of operation of four burners.

FIG. 8 is a schematic view of the time interval of FIG. 7 in which the "on" state of the energy distribution device is represented in the form of a thick line of ordinate 1.

The description which follows relates to the particular case of an industrial furnace equipped with several burners constituting the energy distribution devices, but the invention applies to any installation equipped with energy distribution devices, especially electrical resistors, operating in all or nothing mode, and in operating duration modulation mode.

Figure 1:
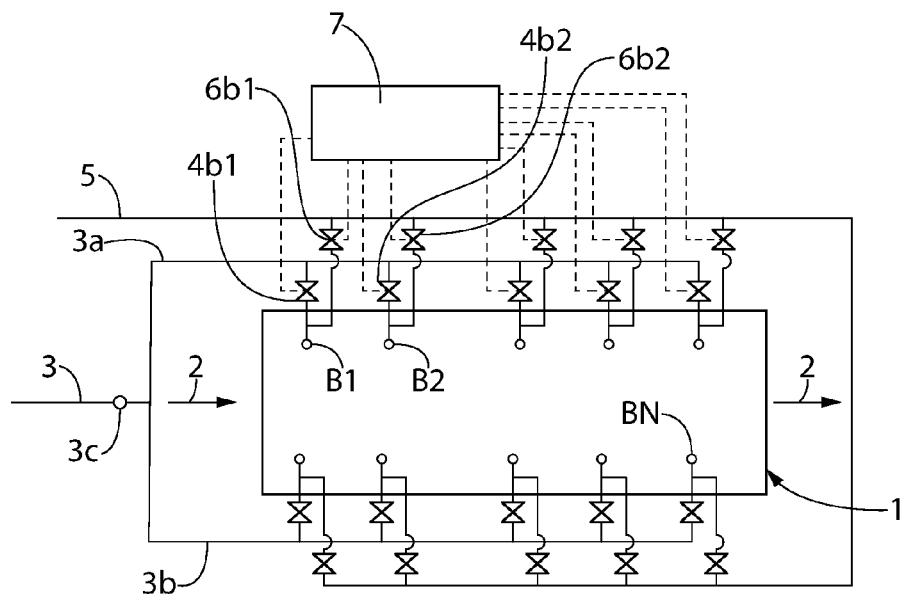

Referring to FIG. 1, it is possible to see, represented schematically, an industrial furnace 1, especially for the heating of iron and steel products which travel continuously in the direction of the arrows 2, entering on the left of the furnace 1 and exiting on the right according to the example drawn. The furnace is equipped with burners B1, B2 . . . BN which operate in all or nothing (on/off) mode and in duration modulation mode. The number N of burners B1, B2 . . . may be several tens, these burners being allotted, during design, over the length of the furnace, according to the processing operations for which this furnace is intended.

Each burner B1, B2 . . . is supplied with fuel on the basis of a common pipeline 3a, 3b, common to several burners, by an automatic isolating valve 4b1, 4b2 . . . . The pipelines 3a, 3b constitute bypass branches of a pipeline 3 generally equipped with a flowmeter 3c upstream of the branches 3a, 3b.

Likewise, the supply of oxidant, especially air or oxygen, for each burner, is ensured by a general pipeline 5 and by bypasses with individual valves 6b1, 6b2 . . . for each burner.

The valves 4b1, 4b2 . . . 6b1, 6b2 . . . are controlled by a computer or calculator 7. The furnace is driven, on the basis of the requirements needed for heating the products which will travel along this furnace, with the aid of a program installed in the computer 7. The program is suited to the type of products, to their speed of travel, to the desired processing. This program determines, for each burner B1, B2 . . . BN, the amount of thermal energy that it must deliver over a time interval I of duration D. This amount of energy corresponds, for a burner Bi, to a duration of operation $\Delta i$, less than or equal to the duration D of the time interval I. This duration of operation is specific to each burner and depends especially on its power, its position and the thermal regime that it is desired to obtain in the furnace. The time intervals D have a limited duration, for example of 30 to 120 seconds, and the computer 7 calculates for each successive time interval values $\Delta i$ for each burner.

The invention is aimed at optimizing the provision of energy by the set of burners Bi over the time intervals I and at limiting the pressure fluctuations in the furnace and in the oxidant and fuel supply networks.

Figure 2:
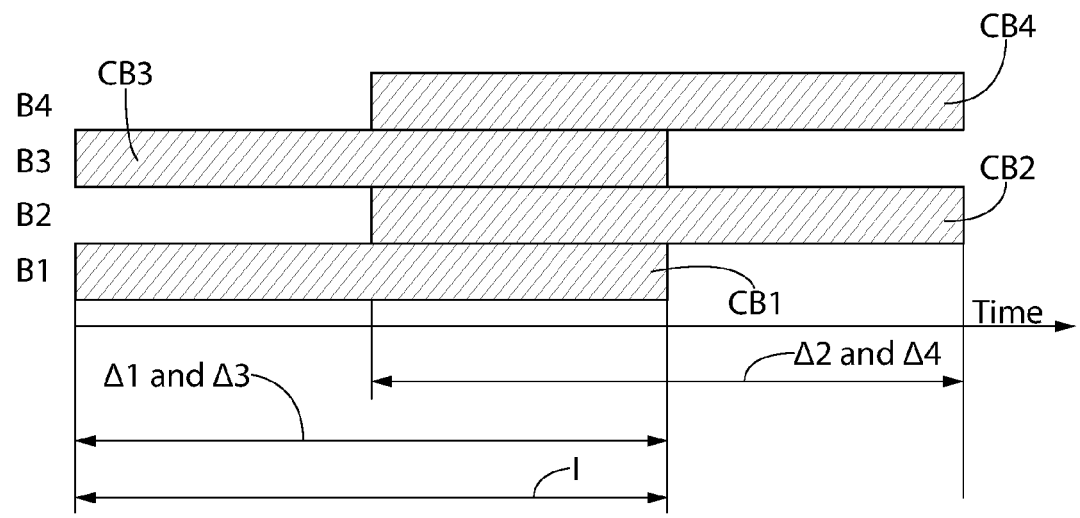
Figure 2:
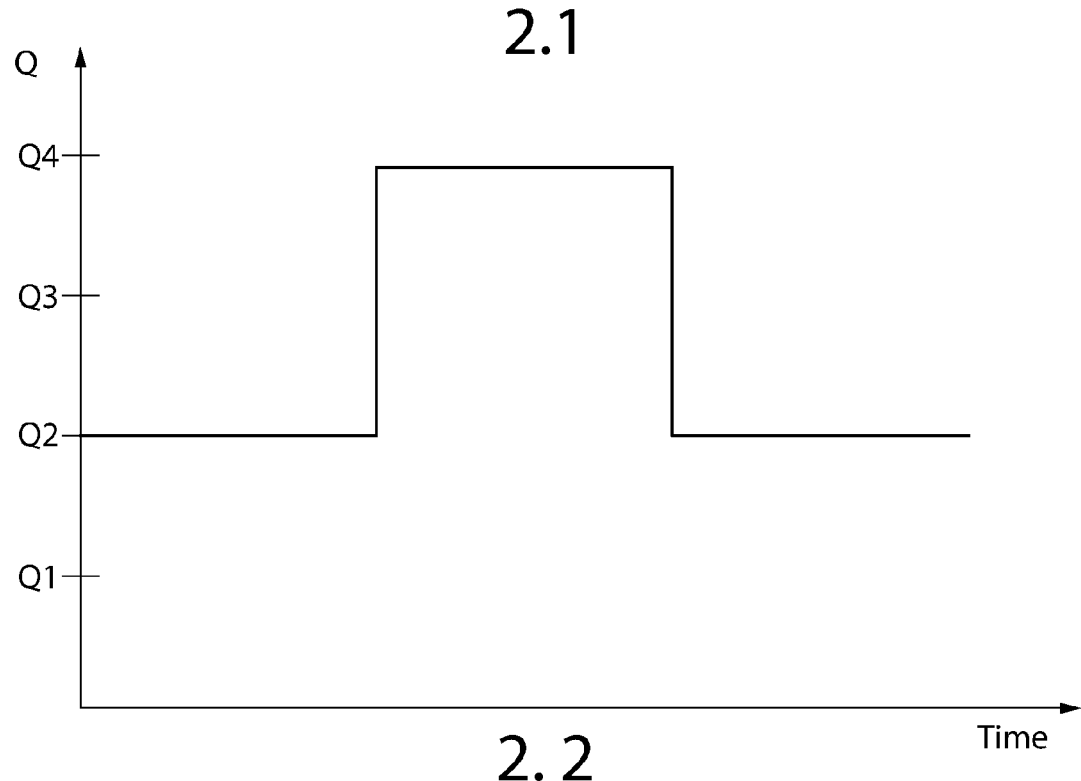

FIG. 2 comprises two simplified charts. The chart 2.1 represents, for four burners B1, B2, B3, B4 with a random possible scheduling, durations of operation $\Delta 1$, $\Delta 2$, $\Delta 3$, $\Delta 4$ allocated to each of the four burners over the time interval I. The slots CB1, CB2, CB3, CB4 on the chart 2.1 illustrate the on state of the burner. The chart 2.2 represents the energy throughput Q delivered by the burners, plotted as ordinate, as a function of time plotted as abscissa. In this example, the four burners have one and the same unit power.

The chart 2.2 reveals a zone of overlap of the durations of operation of the burners B1, B2, B3, B4, thereby leading to a peak in the total energy throughput at a level Q4. In a general way, FIG. 2 reveals a considerable variation in the energy throughput over the time interval I which is not favorable to good conditions of operation and of distribution of the pressures in the furnace 1.

Figure 3:
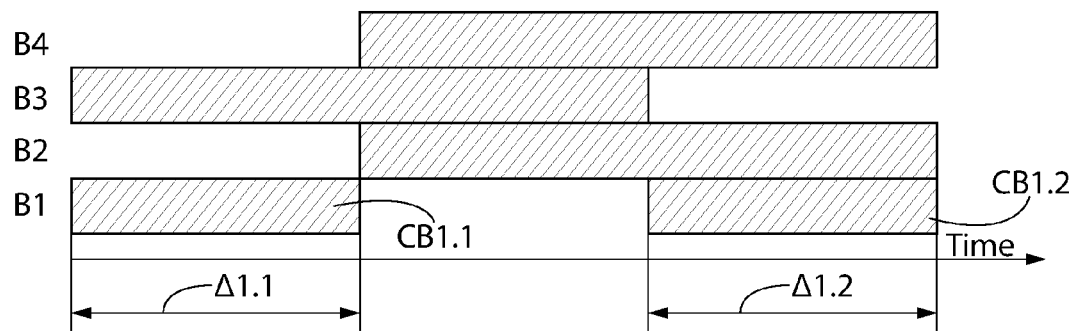
FIG. 3 shows, similarly to FIG. 2, the energy throughput for a different scheduling of the same durations of operation of the four burners, only the position of the duration of operation of a burner being modified.
Figure 3:
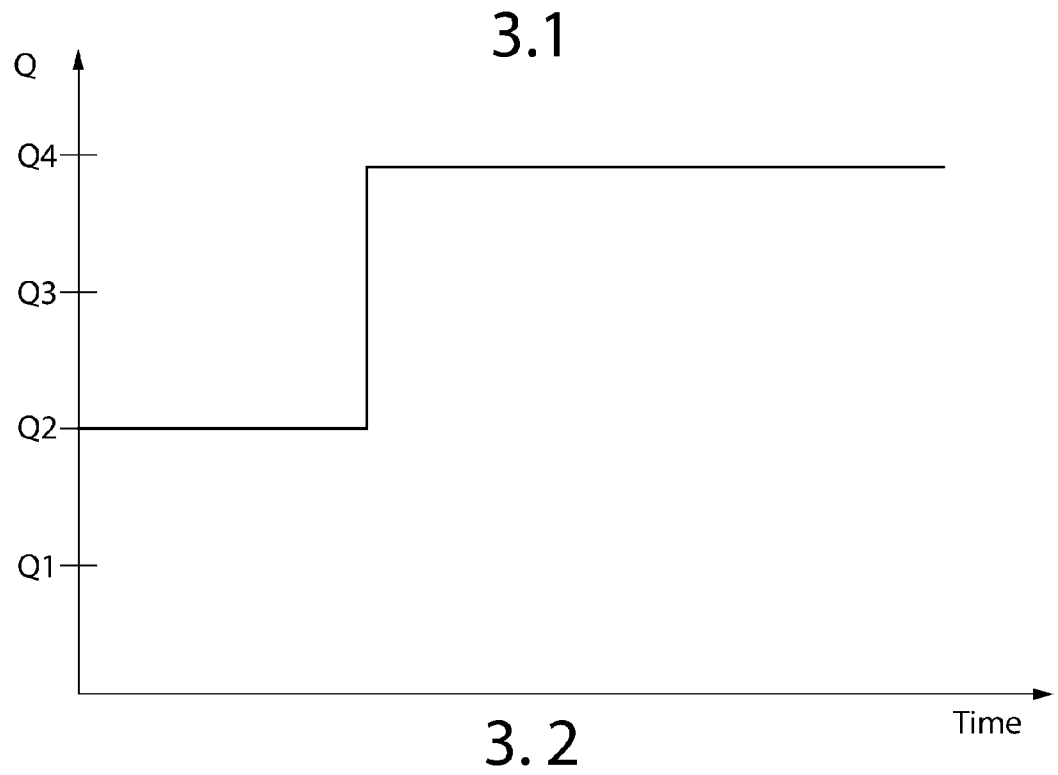

FIG. 3 illustrates a different scheduling of the durations of operation of the four burners B1, B2, B3, B4 of FIG. 2. Only the operation of the burner B1 has been modified with respect to FIG. 2. This has been split into two distinct operating sequences $\Delta 1.1$, $\Delta 1.2$ corresponding to two slots CB1.1 and CB1.2. The chart 3.2 reveals a zone of overlap of the durations of operation of the burners B2, B3, B4, but no longer of the burner B1, thereby leading to a peak in the total energy throughput at a level Q3 which is less than Q4. The scheduling of FIG. 3 for the durations of operation of the four burners makes it possible, with respect to that of FIG. 2, to reduce the variation in energy throughput, and therefore the pressure fluctuations in the supply pipelines, as well as in the furnace, and to improve the operating conditions.

It is appreciated that, for a larger number of burners, especially several tens, optimization of the temporal allotment of the durations of operation will be advantageous for the behavior of the installation as a whole.

It should be noted that the duration of operation $\Delta i$ can consist of a single operating sequence (of duration $\Delta i$), or may be divided as explained in regard to FIG. 7-15 into several sequences of partial durations of less than $\Delta i$, but whose sum is equal to $\Delta i$.

To optimize the energy supply over the time interval I of duration D, a scheduling of the durations of operation $\Delta i$ of each of the N burners B1, B2, . . . BN is determined by proceeding according to the following steps:

Step a) any arbitrary initial scheduling is chosen,

Step b) an order number from 1 to N is associated with each burner B1 . . . BN,

Step c) a search is conducted, for the burner B1 (of order number 1), for the optimal position or positions of the duration of operation CB1 over the time interval I which make it possible to minimize a function U representative of the fluctuations of the energy throughput over the time interval I, the durations of operation of the other burners B2 . . . BN maintaining the positions of the initial scheduling, and an improved resulting scheduling is obtained with the optimal position or positions retained for the sequences of the burner B1.

A simplified example of this result is provided by the scheduling of FIG. 3: the modified position of the duration CB1 in CB1.1 and CB1.2, whereas the durations CB2, CB3 and CB4 have maintained the positions of FIG. 2, has led to a decrease in the amplitude of the throughput variation.

The function U can take various forms.

Figure 4:
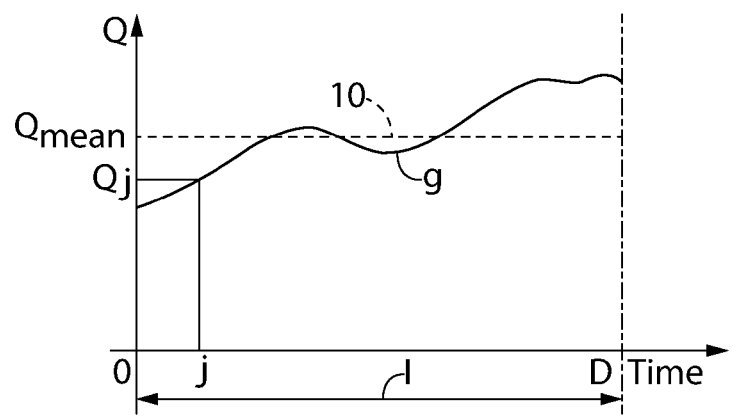
FIG. 4 is a chart illustrating a curve of the energy throughput Q plotted as ordinate, as a function of the time plotted as abscissa.

In FIG. 4 the energy throughput Q, plotted as ordinate, has been represented by a curve 9 as a function of time, plotted as abscissa, over the time interval I of duration D, for a determined scheduling of the burners B1 . . . BN. The area included between the curve 9 and the abscissa axis represents the amount of energy provided over the time interval I and corresponds to the energy provision global instruction given in a known manner by the computer 7. The curve 9 portrays fluctuations on either side of the mean value $Q_{mean}$ of the throughput over the interval I represented by the straight line 10, parallel to the abscissa axis. The curve 9 also illustrates the fluctuations in fuel throughput at the level of the flowmeter 3c. The straight line 10 determines, with the curve 9, equal areas above and below the line 10.

The curve 9 may be established by the computer 7 which performs a sampling of n samples, with sufficiently reduced time increments, especially of the order of a hundredth of D, i.e. D/100, and which determines for each of the n samples the energy throughput $Q_j$ according to the burners which will be turned on at this instant.

A first exemplary function U that one seeks to minimize is the sum of the absolute value of the fluctuations of the energy throughput $Q_j$ about a mean value $Q_{mean}$ during the time interval I:

$$U = \sum_{j=1}^{M} |Q_j - Q_{mean}|$$

Another exemplary function U to be minimized consists of the sum of the squares of the deviations with respect to the arithmetic mean:

$$U = \sum_{j=1}^{M} (Q_j - Q_{mean})^2$$

The program installed in the computer 7 ensures this minimization processing which translates into an optimal scheduling of the durations of operation of the burners.

Figure 5:
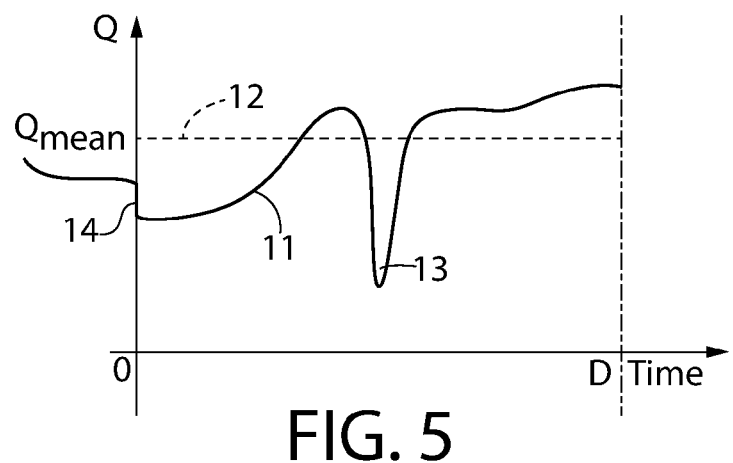
FIG. 5 shows similarly to FIG. 4 a curve of the energy throughput Q as a function of time, with a significant drop in the energy throughput over a reduced temporal segment.

Another criterion that can be taken into account for the optimization of the scheduling is illustrated schematically by the chart of FIG. 5. The curve 11 of throughput as a function of time ensures a total amount of energy over the interval I that is equal to that of FIG. 4, corresponding to the mean value $Q_{mean}$ represented by the straight line 12 parallel to the abscissa axis. The energy provided during the interval I corresponds to the area delimited, over the interval I, between the line 12 and the abscissa axis. Because the areas situated above and below the line 12 between the curve 11 and the line 12 are equal, the scheduling corresponding to the curve 11 yields a global energy provided over the interval I corresponding to the desired value but a negative peak 13 occurs, corresponding to a drop in the throughput over a reduced time. It may be desirable to avoid such abrupt drops in throughput although the objective of energy provision desired over the time interval I is ensured.

In this case, the function U will be able to take into account a determined limit, especially equal to half $Q_{mean}$, i.e $Q_{mean}/2$, so as to keep the absolute value of the gap between the various values $Q_j$ of the curve representative of the throughput over the interval I and the mean value $Q_{mean}$ below this determined limit.

The function U can furthermore take into consideration the difference in energy throughput (FIG. 5) between the end of the previous interval and the start of the new interval, corresponding to the vertical segment 14, so as to minimize this difference in energy throughput.

The scheduling which minimizes a function U taking into account not only the fluctuation of the energy throughput during the time interval I, but also the variation of the energy throughput between the instant preceding the start of the time interval and the instant following the start of the time interval may be retained as optimal scheduling. The function U can then be the sum of the absolute value of the fluctuations $(Q_j-Q_{mean})$ of the energy throughput about a mean value $Q_{mean}$ during the time interval I and of the variation 14 of the total energy throughput between the instant preceding the start of the time interval and the instant following the start of the time interval.

Figure 6:
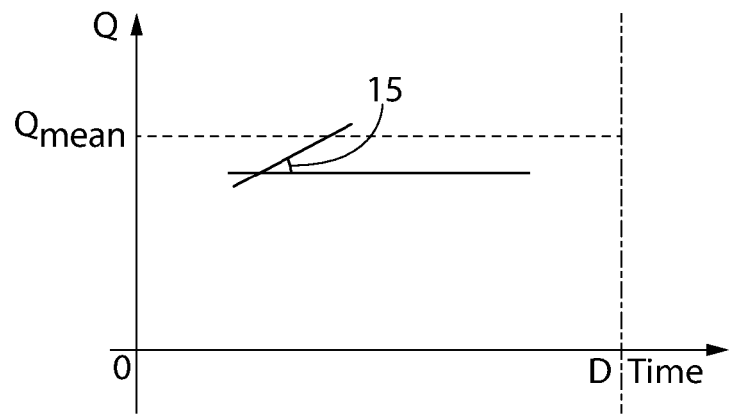
FIG. 6 is a chart schematically illustrating a slope of variation of the energy throughput as a function of time.

FIG. 6 is a chart revealing the taking into account of the slope of the variation (plotted as ordinate) of the energy throughput as a function of time, plotted as abscissa, in the search for optimization. The optimal scheduling may be determined as being that which makes it possible to obtain an angle 15 of inclination of the throughput variation curve, over the mean line 16, which is as small as possible. The function U to be minimized can then be defined as the slope of the tangent to the throughput curve at a point.

After having determined a scheduling with an optimal position, or optimal positions in the case of a splitting, retained for the duration of operation of the burner B1 of order number 1, step c) is repeated on the basis of this scheduling by successively considering the burners of higher order number up to the burner of order number N.

At each repetition, only the position of the duration of operation of the burner whose order number is taken into consideration is displaced over the interval I, the other sequences not being displaced over the interval I.

Step e) Using as initial scheduling that retained in step d), a new order number from 1 to N is associated with each burner and steps c and, d/are repeated.

Step f) step e) is repeated a number of times compatible with the calculation time available before the start of the following time interval I; this number of repetitions depends on the calculation speed of the computer 7.

According to an advantageous embodiment, corresponding to FIGS. 7-15, the time interval I is divided into a number M of temporal subdivisions of not necessarily equal durations. The changes of state of the burners, or more generally of the energy distribution devices, take place between two successive temporal subdivisions.

For an on/off representation, it is possible, as illustrated in FIGS. 7-15, to disregard the power and to represent solely the on or off state of the burner by a binary magnitude 1 or 0. To involve the power of the burner, a weighting coefficient $q_i$ assigned to this burner and representative of its power is then introduced.

Figure 7:
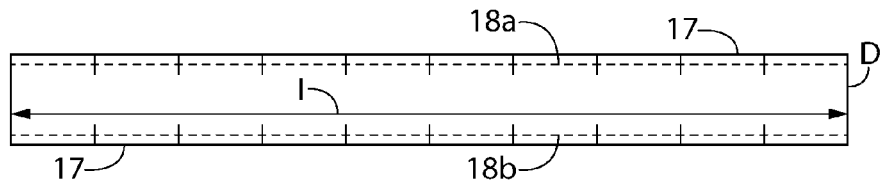
FIG. 7 is a schematic representation of a time interval with subdivisions.

Referring to FIG. 7, it is possible to see, represented schematically, a grid of a time interval I divided into ten temporal subdivisions 17. The dashed horizontal lines 18a and 18b represent states of the energy distribution device. To comment on the figures, we consider that the energy distribution device is a burner. At the level 18a ("1" state), the burner is turned on, whilst at the level 18b ("0 state"), the burner is turned off.

Figure 8:
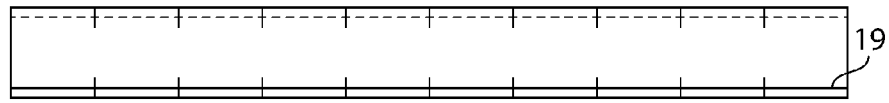
FIG. 8 is a schematic view of the time interval of FIG. 7 in which the "off" state of an energy distribution device is represented by a thick line coincident with the abscissa axis (0 value).

Referring to FIG. 8 of the drawings, it is possible to see, represented schematically, the grid of a time interval of FIG. 7. In this grid, the evolution of the state of the burner is represented as a thick line 19. In this time interval, the burner is permanently off.

Figure 9:

Referring to FIG. 9 of the drawings, it is possible to see, represented schematically, the grid of a time interval of FIG. 7. In this grid, the evolution of the state of a burner is represented as a thick line 20. In this time interval, the burner is permanently on.

In the examples represented in FIG. 8 and FIG. 9, there is no change of state of the burner.

Figure 10:
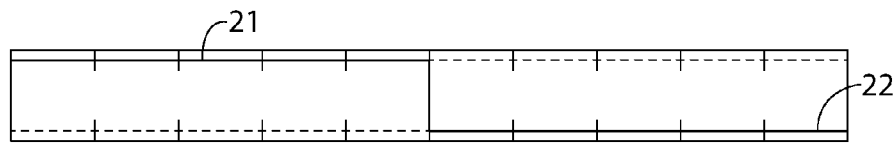
FIG. 10 represents, similarly to FIG. 9, a change of state of the energy distribution device over the time interval.

Referring to FIG. 10 of the drawings, it is possible to see, represented schematically, the grid of a time interval of FIG. 7. In this time interval, the burner is alight over the stretch 21. Between the 5$^{th}$ and the 6$^{th}$ temporal subdivision, the burner is extinguished and kept off over the stretch 22.

Figure 11:
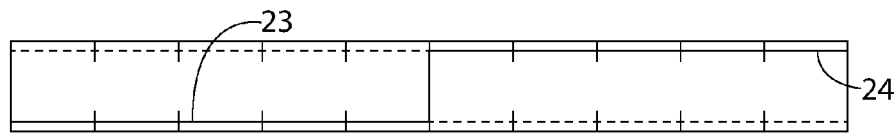
FIG. 11 shows, similarly to FIG. 10, another change of state of the energy distribution device.

Referring to FIG. 11 of the drawings, it is possible to see, represented schematically, the grid of a time interval of FIG. 7. In this time interval, the burner is extinguished over the stretch 23. Between the 5$^{th}$ and the 6$^{th}$ temporal subdivision, the burner is alight and kept on over the stretch 24.

In the examples represented in FIG. 10 and FIG. 11, there is therefore a single change of state of the burner.

Figure 12:
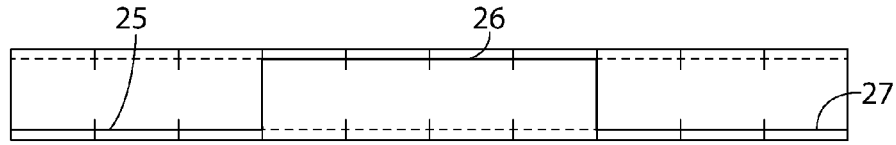
FIG. 12 represents, similarly to FIG. 10, two changes of state of the energy distribution device over the time interval considered.

Referring to FIG. 12 of the drawings, it is possible to see, represented schematically, the grid of a time interval of FIG. 7. In this time interval, the burner is extinguished over the stretch 25. Between the 3$^{rd}$ and the 4$^{th}$ temporal subdivision, the burner is alight and kept on over the stretch 26. Between the 6$^{th}$ and the 7$^{th}$ temporal subdivision, the burner is extinguished and kept off over the stretch 27.

This FIG. 12 represents a time interval comprising a single possible operating sequence according to the invention, with a first change of state between the 3$^{rd}$ and the 4$^{th}$ temporal subdivision, and a second change of state between the 6$^{th}$ and the 7$^{th}$ temporal subdivision. A sequence similar to that of FIG. 12 but with a first change of state between the 2$^{nd}$ and the 3$^{rd}$ temporal subdivision, and a second change of state between the 7$^{th}$ and the 8$^{th}$ temporal subdivision also forms part of the subset of possible sequences according to the invention.

Figure 13:
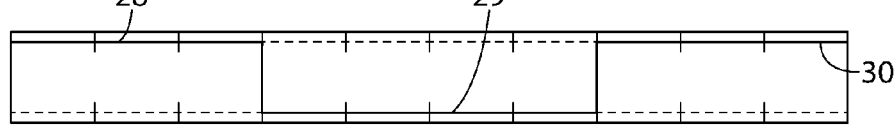
FIG. 13 shows, similarly to FIG. 12, two other changes of state of the energy distribution device.

Referring to FIG. 13 of the drawings, it is possible to see, represented schematically, the grid of a time interval of FIG. 7. In this time interval, the burner is in operation over the stretch 28. Between the 3$^{rd}$ and the 4$^{th}$ temporal subdivision, the burner is extinguished and kept off over the stretch 29. Between the 6$^{th}$ and the 7$^{th}$ temporal subdivision, the burner is alight and kept on over the stretch 30.

In the examples represented in FIG. 12 and FIG. 13, there are therefore two changes of state of the burner.

Figure 14:
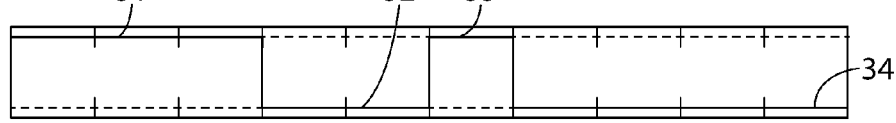
FIG. 14 shows, similarly to FIG. 12, three changes of state of the energy distribution device.

Referring to FIG. 14 of the drawings, it is possible to see, represented schematically, the grid of a time interval of FIG. 7. In this time interval, the burner is in operation over the stretch 31. Between the 3$^{rd}$ and the 4$^{th}$ temporal subdivision, the burner is extinguished and kept off over the stretch 32. Between the 5$^{th}$ and the 6$^{th}$ temporal subdivision, the burner is alight and kept on over the stretch 33. Between the 6$^{th}$ and the 7$^{th}$ temporal subdivision, the burner is extinguished and kept off over the stretch 34.

Figure 15:
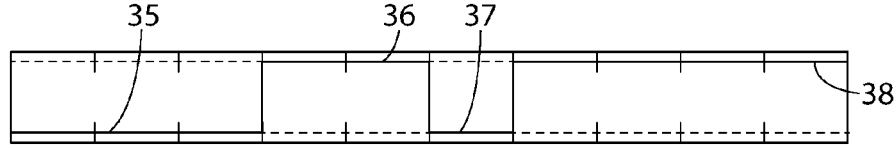
FIG. 15 shows, similarly to FIG. 14, three other changes of state of the energy distribution device, and, FIG. 16 is a schematic representation of the coding of the state of the energy distribution devices in the form of a binary matrix.

Referring to FIG. 15 of the drawings, it is possible to see, represented schematically, the grid of a time interval of FIG. 7. In this time interval, the burner is off over the stretch 35. Between the 3$^{rd}$ and the 4$^{th}$ temporal subdivision, the burner is alight and kept on over the stretch 36. Between the 5$^{th}$ and the 6$^{th}$ temporal subdivision, the burner is extinguished and kept off over the stretch 37. Between the 6$^{th}$ and the 7$^{th}$ temporal subdivision, the burner is alright and kept in operation over the stretch 38.

In the examples represented in FIG. 14 and FIG. 15, there are therefore three changes of state of the burner.

The profiles of change of state of an energy distribution device represented in FIGS. 10 to 15 are given by way of nonlimiting example, each change of state being able to occur at the end of another temporal subdivision.

The time gap between two changes of state, that is to say the horizontal distance between two successive vertical segments in FIGS. 12 to 15, is greater than a determined limit, in particular than a twentieth of the duration D of the interval, i.e. greater than D/20.

The last change of state over the interval I is separated from the end of this interval I by a minimum time gap, in particular at least equal to a twentieth of the duration D of the interval, i.e. D/20.

Figure 16:
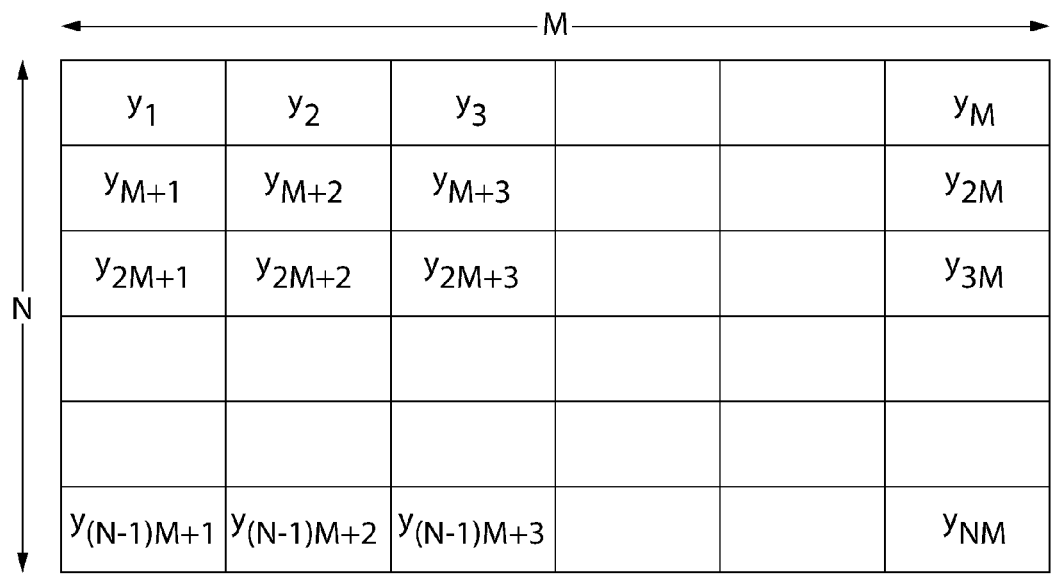

According to an exemplary embodiment, represented in FIG. 16, of the invention, the states of the distribution devices are coded according to a binary matrix Z of size N×M, having N rows and M columns, each of the N rows of which codes the state of the various burners during the M successive temporal subdivisions, each column corresponding to a temporal subdivision.

The burners have different powers and are advantageously assigned a weighting coefficient $q_i$ representative of the power of the relevant burner. In practice $q_i$ does not depend on the temporal subdivision since the power of the burner is constant.

Each element of the matrix Z is designated by $y_k$ with k an integer index varying between 1 and N×M, in accordance with a row numbering as represented in FIG. 16. The elements $y_k$ have the value 0 or 1.

For a temporal subdivision j corresponding to a column of the matrix Z, the total energy throughput $Q_j$ during this subdivision is equal to:

$$Q_j = \sum_{i=1}^{N} y_{j+(i-1)M} \times q_i$$

The function U to be minimized may be the sum of the absolute value of the fluctuations of the energy throughput for a subdivision about a mean value $Q_{mean}$ during the time interval I. This function U may be written:

$$U = \sum_{j=1}^{M} |Q_j - Q_{mean}|$$

According to another embodiment of the invention, the function U may be the sum of the square of the fluctuations of the energy throughput for a subdivision about a mean value $Q_{mean}$ during the time interval I. It may then be written:

$$U = \sum_{j=1}^{M} (Q_j - Q_{mean})^2$$

According to another embodiment of the invention, the function U to be minimized may be the sum of the absolute value of the variations of the energy throughput between two successive subdivisions during the time interval I. This function U may be written:

$$U = \sum_{j=1}^{M-1} |Q_j - Q_{j+1}|$$

According to another embodiment of the invention, the function U to be minimized may be the sum of the square of the variations of the energy throughput between two successive subdivisions during the time interval I. This function U may be written $$U = \sum_{j=1}^{M-1} (Q_j - Q_{j+1})^2$$

It should be noted that the function U can also take one of the forms described previously and which would be supplemented with additional terms, for example the variation between the first temporal subdivision of a time interval and the last temporal subdivision of the previous time interval.

According to another exemplary embodiment of the invention, the function U can be expressed in the form $\Sigma_i \Sigma_j \alpha_{ij} y_i y_j$, which is the weighted sum of the products of the pairs of components of a vector Y, with i and j integer indices between 1 and N×M, and $\alpha_{ij}$ are weighting coefficients.

The invention makes it possible to obtain optimal efficiency of a furnace with burners operating in all or nothing mode, and in duration modulation mode. The invention ensures a drop in the throughput fluctuations, better combustion, and a decrease in polluting waste. When a furnace is started up, the best running conditions are obtained very rapidly and automatically, and are maintained.

By way of example, on a reheating furnace with a capacity of 400 t/h, switching from a method for scheduling the ignition of the burners according to FR2853959 to that according to the invention makes it possible to reduce the fluctuations in throughputs of oxidant and of fuel by about 30%.

The invention claimed is:

1. A method for optimizing the energy supply, over a time interval I of duration D, of an installation equipped with N energy distribution devices operating in all or nothing mode and in duration modulation mode, the method comprising:
    allocating, by a programmable processor, a duration of operation $\Delta i$, less than or equal to the duration D, to each of the N energy distribution devices over the time interval I, wherein at least one of the N energy distribution devices is allocated a duration of operation $\Delta i$ that is less than the duration D;
    deducing, by the programmable processor, each duration of operation $\Delta i$ from the energy demand of the installation, wherein the duration of operation $\Delta i$ of at least a first of the N energy distribution devices is divided by one or more off states into several sequences of partial duration, whose sum is equal to $\Delta i$;
    defining, by the programmable processor, a scheduling over the time interval I by a temporal allotment of the set of operating sequences of the N energy distribution devices, wherein the several sequences of partial duration of the first of the N energy distribution devices are temporally distributed over the time interval I;
    calculating, by the programmable processor, the scheduling before the start of the time interval I by taking account of the desired durations $\Delta i$ of operation of each energy distribution device; and
    controlling, with the programmable processor, operation of the N energy distribution devices according to the calculated scheduling.

2. The method as claimed in claim 1, wherein the scheduling is calculated as follows:
    a/ any arbitrary initial scheduling is chosen,
    b/ an order number from 1 to N is associated with each distribution device,
    c/ for the distribution device of order number 1, a search is conducted for the number, the duration or durations and the position or positions over the time interval I of the operating sequence or sequences of this distribution device which make it possible to minimize a function U representative of fluctuations of an energy throughput over the time interval, the sequences of the other devices maintaining the positions of the initial scheduling,
    and a resulting scheduling is obtained with the number, the duration or durations and the optimal position or positions retained for the sequences of the device of order number 1,
    d/ step (c) is repeated on the basis of the scheduling resulting from step (c) by successively considering the distribution devices of higher order number up to the distribution device of order number N.

3. The method as claimed in claim 1, further comprising the following additional steps:
    e/ by using as initial scheduling the scheduling retained in step (d), a new order number from 1 to N is associated with each distribution device and steps (c) and (d) are repeated,
    g/ step (e) is repeated a number of times compatible with the calculation time available before the start of the time interval.

4. The method as claimed in claim 2, wherein the order number allocated to each distribution device is dependent on the desired durations of operation $\Delta i$, the device of order number 1 being that whose desired duration of operation $\Delta 1$ is the longest and the device of order number N being that whose desired duration of operation $\Delta N$ is the shortest.

5. The method as claimed in claim 1, wherein the time interval I is divided into a number M of temporal subdivisions of not necessarily equal durations.

6. The method as claimed in claim 5, wherein the states of the distribution devices are coded according to a binary matrix Z of size N×M (N rows and M columns), each of the N rows of which codes the state of the various distribution devices during the successive temporal subdivisions and each column of which corresponds to a temporal subdivision.

7. The method as claimed in claim 2, wherein the function U to be minimized is the sum of the absolute value of the fluctuations of the energy throughput $Q_j$ about a mean value $Q_{mean}$ during the time interval I:

$$U = \sum_{j=1}^{M} |Q_j - Q_{mean}|.$$

8. The method as claimed in claim 2, wherein the function U to be minimized consists of the sum of the squares of the deviations with respect to the arithmetic mean:

$$U = \sum_{j=1}^{M} (Q_j - Q_{mean})^2.$$

9. The method as claimed in claim 2, wherein the function U to be minimized consists of the sum of the absolute value of the variations of the energy throughput between two successive subdivisions during the time interval I:

$$U = \sum_{j=1}^{M-1} |Q_j - Q_{j+1}|.$$

10. The method as claimed in claim 2, wherein the function U to be minimized consists of the sum of the square of the variations of the energy throughput between two successive subdivisions during the time interval I:

$$U = \sum_{j=1}^{M-1} (Q_j - Q_{j+1})^2.$$

11. The method as claimed in claim 7, wherein the function U to be minimized is supplemented with additional terms.

12. The method as claimed in claim 2, wherein the function U to be minimized takes into account not only the fluctuation of the energy throughput during the time interval I, but also the variation of the energy throughput between the instant preceding the start of the time interval and the instant following the start of the time interval, the function U being the sum of the absolute value of the fluctuations of the energy throughput about a mean value during the time interval I and of a variation of a total energy throughput between the instant preceding the start of the time interval and the instant following the start of the time interval.

13. The method as claimed in claim 1, wherein a total energy throughput engendered by the scheduling obtained does not exceed a defined threshold.

14. The method as claimed in claim 1, wherein the desired durations of operation of the energy distribution devices are reduced if they lead to a total energy throughput which exceeds a defined threshold.

15. The method as claimed in claim 1, wherein, for each energy distribution device, the gap between the duration of operation over a time interval I and the desired duration is limited by a maximum gap, in particular of 5% of the duration of the time interval.

16. The method as claimed in claim 1, wherein the sequences for each energy distribution device correspond at most to three changes of state of the device over a time interval I.

17. The method as claimed in claim 1, wherein two successive changes of state of each energy distribution device are spaced apart by a minimum time gap, in particular at least equal to a twentieth of the duration D of the time interval, i.e. D/20.

18. The method as claimed in claim 1, wherein, for each energy distribution device, the last change of state during the time interval I is spaced apart by a minimum time gap from the end of the interval, the minimum time gap being at least equal to a twentieth of the duration D of the time interval, i.e. D/20.

19. The method as claimed in claim 2, wherein the initial scheduling is that where all the energy distribution devices are off during the time interval.

20. The method as claimed in claim 2, wherein the order number allocated to each distribution device after the first iteration is random.

21. The method as claimed in claim 5, wherein the changes of state of the distribution devices take place between two successive temporal subdivisions.

22. The method as claimed in claim 1, wherein the energy distribution devices are burners and a throughput of the energy supply of the installation is proportional to a fuel supply throughput for the burners.

23. The method as claimed in claim 2, wherein the function U is expressed in the form $\Sigma_i \Sigma_j \alpha_{ij} y_i y_j$, which is the weighted sum of the products of the pairs of components of a vector Y, with i and j integer indices between 1 and N×M, and $\alpha_{ij}$ are weighting coefficients.

24. The method as claimed in claim 1 for the driving of a reheating furnace whose energy distribution devices consist of burners or electrical resistors.

25. An installation equipped with energy distribution devices operating in all or nothing mode and in operating duration modulation mode, comprising a programmable device configured to control the energy distribution devices in accordance with the method of claim 1.

26. The installation as claimed in claim 25, comprising an industrial furnace.

* * * * *